(12) United States Patent
Arai et al.

(10) Patent No.: US 12,454,079 B2
(45) Date of Patent: Oct. 28, 2025

(54) METHOD FOR MANUFACTURING MOLD FOR RETROREFLECTIVE ELEMENT AND METHOD FOR MANUFACTURING RETROREFLECTIVE ELEMENT

(71) Applicant: NALUX CO., LTD., Osaka (JP)

(72) Inventors: Sho Arai, Osaka (JP); Yukinobu Nishio, Osaka (JP)

(73) Assignee: NALUX CO., LTD., Osaka (JP)

( * ) Notice: Subject to any disclaimer, the term of this patent is extended or adjusted under 35 U.S.C. 154(b) by 241 days.

(21) Appl. No.: 18/100,274

(22) Filed: Jan. 23, 2023

(65) Prior Publication Data

US 2023/0158717 A1  May 25, 2023

Related U.S. Application Data

(63) Continuation of application No. PCT/JP2021/028738, filed on Aug. 3, 2021.

(60) Provisional application No. 63/061,610, filed on Aug. 5, 2020.

(51) Int. Cl.
*B29C 33/38* (2006.01)
*B29C 33/42* (2006.01)
*B29D 11/00* (2006.01)

(52) U.S. Cl.
CPC .......... *B29C 33/3842* (2013.01); *B29C 33/42* (2013.01); *B29D 11/00625* (2013.01)

(58) Field of Classification Search
CPC ............................................ B29D 11/00625
See application file for complete search history.

(56) References Cited

U.S. PATENT DOCUMENTS

| 5,557,836 A | 9/1996 | Smith et al. |
| 5,721,640 A | 2/1998 | Smith et al. |
| 5,814,355 A | 9/1998 | Shusta et al. |
| 5,914,813 A | 6/1999 | Smith et al. |

(Continued)

FOREIGN PATENT DOCUMENTS

| EP | 0 724 733 B1 | 9/2001 |
| EP | 1 698 915 A1 | 9/2006 |

(Continued)

OTHER PUBLICATIONS

JP 2013202750 (Year: 2013).*

(Continued)

*Primary Examiner* — Nahida Sultana
*Assistant Examiner* — Debjani Roy
(74) *Attorney, Agent, or Firm* — SQUIRE PATTON BOGGS (US) LLP

(57) ABSTRACT

A method for manufacturing a mold for a retroreflective element, the mold having plural polygonal faces having a common vertex, the method including the steps of: roughing of a polygonal face in which cutting is carried out such that a predetermined cutting amount in a finishing process is left with respect to a desired shape; and finishing of the polygonal face in which a blade portion is made to move relatively towards the vertex while an angle of relief of the blade portion is kept within 1 degree so as to carry out cutting of the predetermined cutting amount, wherein a depth of cut for each one-time cutting operation is 2 micrometers or smaller, and the movement of the blade portion is a combination of a motion towards the vertex and an oscillation.

8 Claims, 9 Drawing Sheets

(56) References Cited

U.S. PATENT DOCUMENTS

| | | | |
|---|---|---|---|
| 11,654,491 B2* | 5/2023 | Arimatsu | B23Q 5/00 82/118 |
| 2003/0075815 A1* | 4/2003 | Couzin | G02B 5/124 264/1.34 |
| 2007/0109641 A1* | 5/2007 | Mimura | G02B 5/124 359/530 |
| 2010/0165463 A1 | 7/2010 | Mimura | |
| 2011/0027032 A1* | 2/2011 | Keller | B24B 13/046 409/219 |
| 2019/0079223 A1 | 3/2019 | Scott et al. | |

FOREIGN PATENT DOCUMENTS

| | | |
|---|---|---|
| EP | 2 259 099 A1 | 12/2010 |
| JP | 9-504619 A | 5/1997 |
| JP | 2000-509166 A | 7/2000 |
| JP | 2013-202750 A | 10/2013 |
| JP | 2020-533637 A | 11/2020 |
| WO | 95/11463 A2 | 4/1995 |
| WO | 97/41464 A1 | 11/1997 |
| WO | 2005/054909 A1 | 6/2005 |
| WO | 2019/051413 A1 | 3/2019 |

OTHER PUBLICATIONS

International Search Report and Written Opinion dated Oct. 26, 2021 corresponding to International Patent Application No. PCT/JP2021/028738, with English translation.

\* cited by examiner

METHOD FOR MANUFACTURING MOLD FOR RETROREFLECTIVE ELEMENT AND METHOD FOR MANUFACTURING RETROREFLECTIVE ELEMENT

CROSS REFERENCE TO RELATED APPLICATION

This is a Continuation of International Patent Application No. PCT/JP2021/028738 filed Aug. 3, 2021, which designates the U.S., and which claims priority from U.S. Provisional Patent Application No. 63/061,610, dated Aug. 5, 2020. The contents of these applications are hereby incorporated by reference.

TECHNICAL FIELD

The present invention relates to a method for manufacturing a mold for a retroreflective element and a method for manufacturing a retroreflective element using the mold.

BACKGROUND ART

Manufacturing methods of a mold for a corner cube, a typical example of retroreflective elements, are given below. In the first manufacturing method, a mold is formed by combining plural bars, each bar being called a pin, such that a face of each pin forms a face of the mold, the face of the mold corresponding to a face of the corner cube. Each pin is manufactured through ultraprecision polishing. In the second manufacturing method, a mold is manufactured through milling using a multi-axis machine tool provided with a ball end mill.

Recently a need for downsizing of the segment of a corner cube has been increasing. The segment is a constructional unit of a corner cube and is formed by three adjacent faces corresponding to those of a cube.

In the first manufacturing method, a mold can hardly be manufactured using pins when the size of a segment, that is, the diagonal of a square face of the segment is smaller than 1 millimeter.

Further, even when a mold can be manufactured using pins, the number of pins used to manufacture a corner cube having a certain area size increases in direct ratio to the inverse of the square of the size of the segment. Accordingly, if the size of the segment is smaller than 2 millimeters, the number of pins remarkably increases so that the machining costs also remarkably increase.

In the second manufacturing method, a circular shape of the edge of a blade of a ball end mill is exactly transferred to the shape of an object to be machined when a mold is manufactured through milling. Accordingly, an object in which the radius of curvature of a corner should be made smaller than the minimum radius of curvature of the ball end mill, that is, 0.03 micrometers, cannot be manufactured by the method. Further, optical performance of retroreflective elements manufactured using a mold manufactured by the method deteriorates as the segment decreases in size.

On the other hand, a manufacturing method called micro chiseling has been developed as a new manufacturing method for a mold for a retroreflective element having small segments (for example, patent document 1). However, a mold for a retroreflective element shaped with a sufficiently high accuracy cannot be obtained by this manufacturing method.

Accordingly, there is a need for a method for manufacturing with a high efficiency a mold for a retroreflective element shaped with a sufficiently high accuracy and a method for manufacturing a retroreflective element using the mold.

PRIOR ART DOCUMENT

Patent Document

Patent document 1; WO2019051413

The object of the present invention is to provide a method for manufacturing with a high efficiency a mold for a retroreflective element shaped with a sufficiently high accuracy and a method for manufacturing a retroreflective element using the mold.

SUMMARY OF THE INVENTION

A method for manufacturing a mold for a retroreflective element according to a first aspect of the present invention is a method for manufacturing a mold having plural polygonal faces having a common vertex. The method includes the steps of roughing of a polygonal face in which cutting is carried out such that a predetermined cutting amount in a finishing process is left with respect to a shape to be obtained; and finishing of the polygonal face in which a blade portion having two cutting edges, an angle formed by the two cutting edges being substantially identical with an interior angle of the polygonal face at the vertex and a length of each of the two cutting edges being equal to or greater than a length of each of the edges of the polygonal face meeting at the vertex, is made to move relatively towards the vertex while an angle of relief of the blade portion is kept within 1 degree so as to carry out cutting of the predetermined cutting amount, wherein a depth of cut for each one-time cutting operation is 2 micrometers or smaller, and the movement of the blade portion is a combination of a motion towards the vertex and an oscillation that causes at least one of a displacement in the direction of the motion and a displacement in the direction perpendicular to the direction of the motion.

In the manufacturing method according to the present aspect, since the face is cut by the motion of the blade portion towards the vertex of the polygonal face, the blade portion having two cutting edges, an angle formed by the two cutting edges being substantially identical with an interior angle of the polygonal face and a length of each of the two cutting edges being equal to or greater than a length of each of the edges of the polygonal face meeting at the vertex, a surface can be cut with a high efficiency. Further, since the movement of the blade portion is a combination of the motion towards the vertex and an oscillation, a random change in height of the cut surface can be reduced and a mold shaped with a high accuracy can be manufactured.

In the method for manufacturing a mold for a retroreflective element according to a first embodiment of the first aspect of the present invention, the absolute value of inclination of a plane of the oscillation from a plane formed by the two cutting edges is within 3 degrees.

In the method for manufacturing a mold for a retroreflective element according to a second embodiment of the first aspect of the present invention, the displacement caused by the oscillation in the direction perpendicular to the direction of the motion ranges from 0.1 micrometers to 25 micrometers.

According to the present embodiment, a remarkable effect of reducing a random change in height of the cut face can be obtained.

In the method for manufacturing a mold for a retroreflective element according to a third embodiment of the first aspect of the present invention, the displacement caused by the oscillation in the direction of the motion ranges from 0.1 micrometers to 25 micrometers.

According to the present embodiment, a remarkable effect of reducing a random change in height of the cut face can be obtained.

In the method for manufacturing a mold for a retroreflective element according to a fourth embodiment of the first aspect of the present invention, a distance travelled by the blade portion in the direction of the motion during a period of the oscillation ranges from 0.01 micrometers to 20 micrometers.

According to the present embodiment, a remarkable effect of reducing a random change in height of the cut face can be obtained.

In the method for manufacturing a mold for a retroreflective element according to a fifth embodiment of the first aspect of the present invention, the blade portion is attached to a multi-axis machine tool, and the motion and the oscillation are carried out by the multi-axis machine.

According to the present embodiment, an accuracy of a machined face can be improved by combining the motion and various types of oscillation.

In the method for manufacturing a mold for a retroreflective element according to a sixth embodiment of the first aspect of the present invention, the oscillation is brought by a circular motion, an elliptic motion or a simple harmonic motion.

In the method for manufacturing a mold for a retroreflective element according to a seventh embodiment of the first aspect of the present invention, the blade portion is attached to an oscillator, and the oscillator is attached to a multi-axis machine tool such that the motion is carried out by the multi-axis machine, and the oscillation is carried out by the oscillator.

In the present embodiment, the multi-axis machine carries out the motion alone, and therefore a high efficiency can be obtained.

In the method for manufacturing a mold for a retroreflective element according to a eighth embodiment of the first aspect of the present invention, the retroreflective element is a corner cube, and the angle formed by the two edges of the blade portion is 90 degrees.

A method for manufacturing a retroreflective element according to a second aspect of the present invention uses a mold manufactured by any one of the methods for manufacturing a mold for a retroreflective element described above.

According to the present aspect, a retroreflective element shaped with a high accuracy can be obtained.

DESCRIPTION OF EMBODIMENTS

Figure 1:
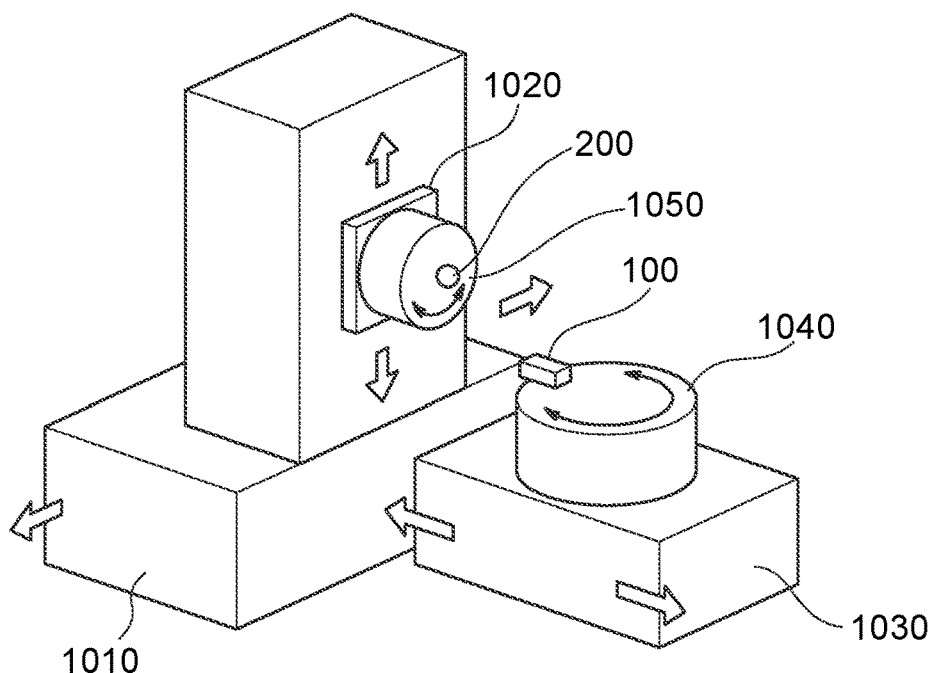
FIG. 1 shows an example of a multi-axis machine tool used to carry out a method for manufacturing a mold for a retroreflective element according to the present invention.

FIG. 1 shows an example of a multi-axis machine tool used to carry out a method for manufacturing a mold for a retroreflective element according to the present invention. The multi-axis machine tool 1000 is provided with an x-axis stage 1010, a y-axis stage 1020 and a z-axis stage 1030, each of which is configured to carry out a linear motion. The directions of linear motions of the three stages are orthogonal to one another. The multi-axis machine tool 1000 is further provided with a B-axis stage 1040 that is attached to the z-axis stage 1030 such that the B-axis stage 1040 is rotatable and a C-axis stage 1050 that is attached to the y-axis stage 1020 such that the C-axis stage 1050 is rotatable. After a work piece 200 has been attached to the C-axis stage 1050, and a cutting tool 100 has been attached to the B-axis stage 1040, the work piece 200 is machined by the cutting tool 100 while moving each stage.

Figure 2:
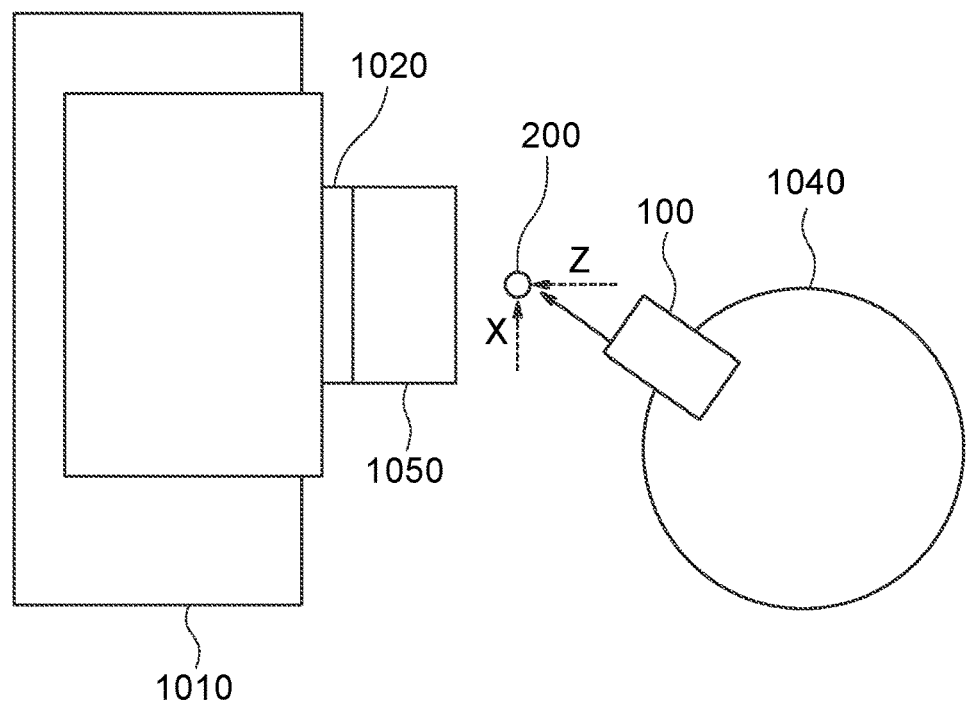
FIG. 2 shows a view of the multi-axis machine tool 1000 from a viewpoint on the Y-axis.

FIG. 2 shows a view of the multi-axis machine tool 1000 from a viewpoint on the Y-axis. Operations of the multi-axis machine tool 1000 will be described later.

Figure 3:
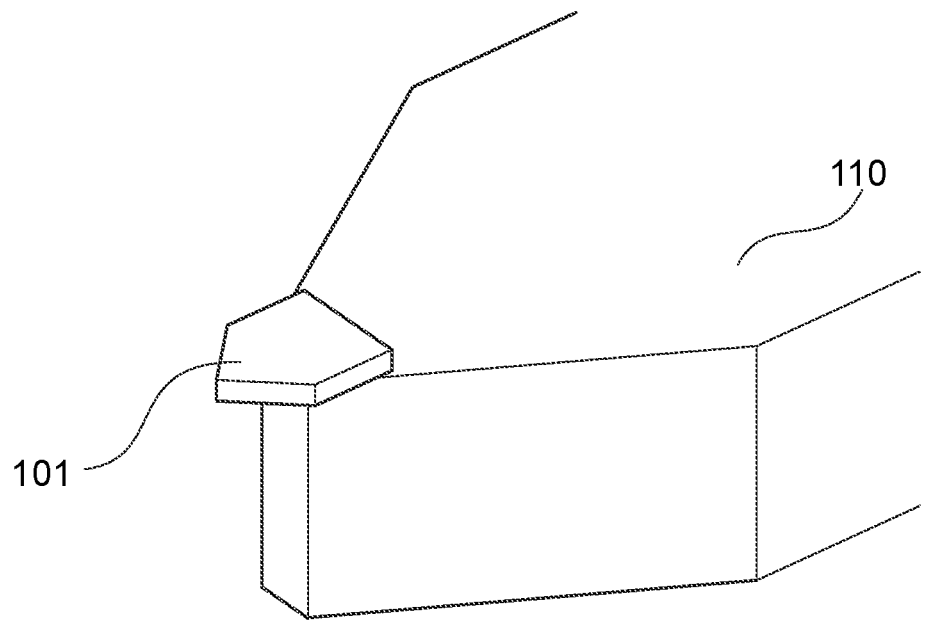
FIG. 3 shows an example of a cutting tool.

FIG. 3 shows an example of a cutting tool. The cutting tool shown in FIG. 3 is provided with a blade portion 101 including a blade made of single crystal diamond and a shank portion 110.

Figure 4:
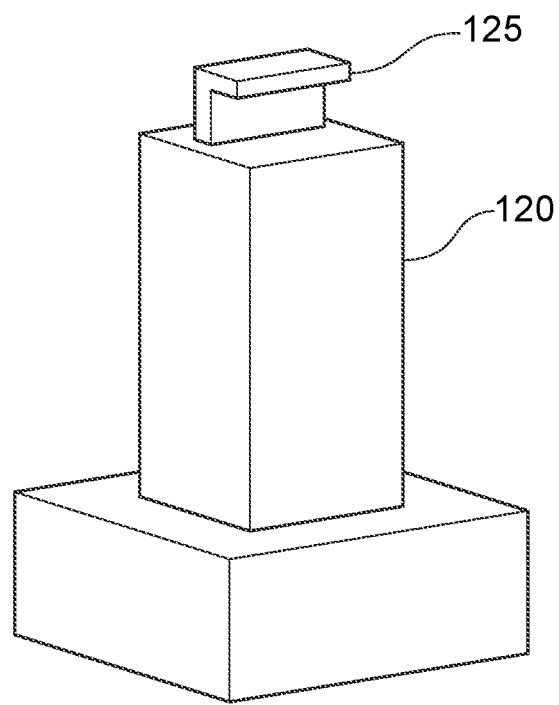
FIG. 4 shows a jig used to attach the cutting tool shown in FIG. 3 to the B-axis stage.

FIG. 4 shows a jig used to attach the cutting tool shown in FIG. 3 to the B-axis stage 1040. The cutting tool is attached to the B-axis stage 1040 by fixing the shank portion 110 of the cutting tool between a member 120 and a member 125 of the jig using a screw or the like.

Figure 5:
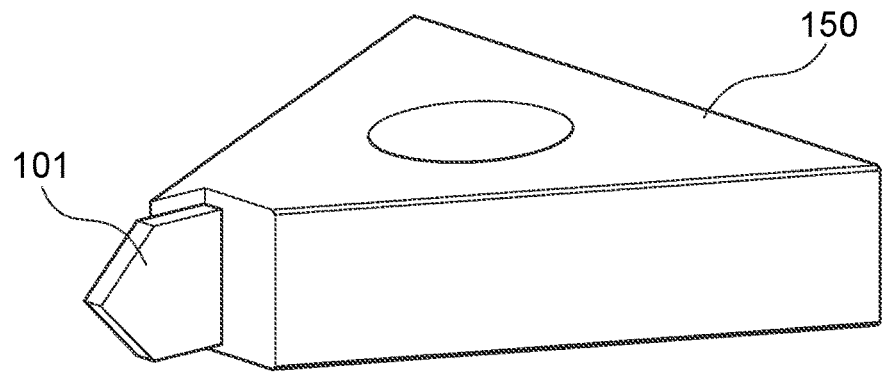
FIG. 5 shows another example of a cutting tool.

FIG. 5 shows another example of a cutting tool. The cutting tool shown in FIG. 5 is provided with a blade portion 101 including a blade made of single crystal diamond and a member 150.

Figure 6:
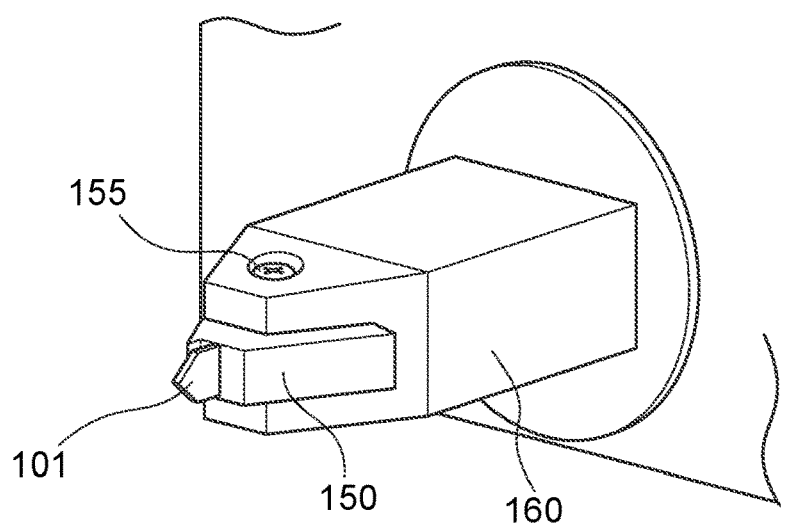
FIG. 6 shows an oscillator to which the cutting tool shown in FIG. 5 is attached.

FIG. 6 shows an oscillator 160 to which the cutting tool shown in FIG. 5 is attached. The cutting tool shown in FIG. 5 is attached to the oscillator 160 by fixing the member 150 to the oscillator 160 using a screw 155. Operations of the oscillator 160 will be described later.

Figure 7:
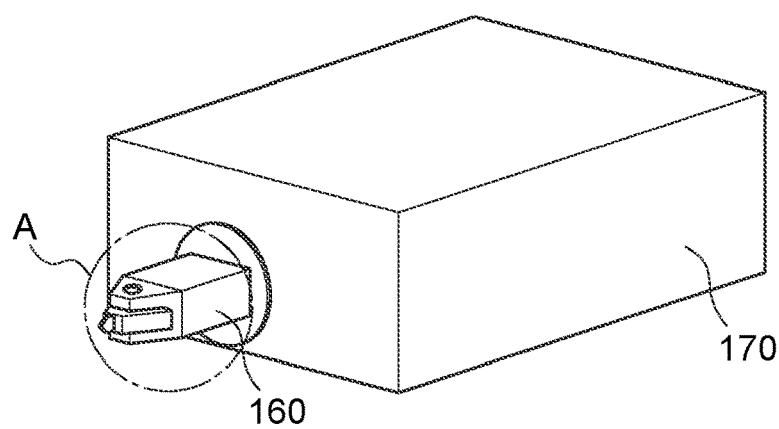
FIG. 7 shows a cutting unit to which the oscillator is attached.

FIG. 7 shows a cutting unit 170 to which the oscillator 160 is attached. FIG. 6 shows the portion that is marked with A in FIG. 7. The cutting unit 170 is attached to the B-axis stage 1040 by screws or the like.

Figure 8:
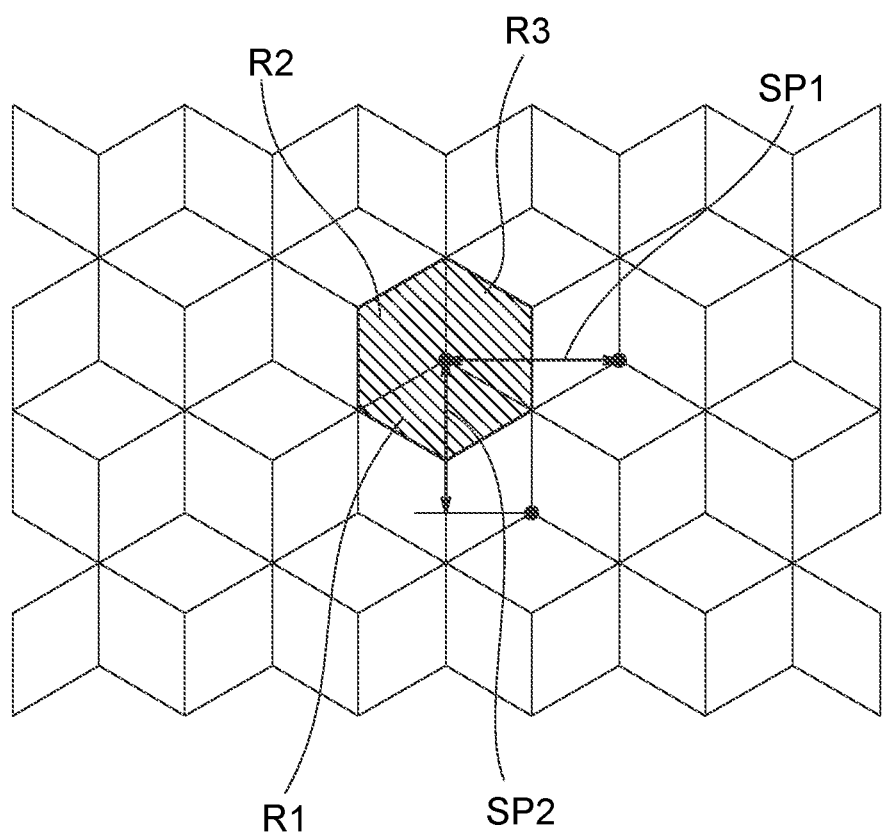
FIG. 8 shows a plan view of a corner cube as an example of a retroreflective element.

FIG. 8 shows a plan view of a corner cube as an example of a retroreflective element. A corner cube is a combination of plural segments arranged contiguously at predetermined intervals of SP1 and SP2, each segment including three square faces R1, R2 and R3. The three square faces are orthogonal to one another and form a vertex of a cube. An incident ray to the corner cube is reflected by faces and then travels in the direction opposite to the direction of the incident ray.

Table 1 shows an example of specifications of a corner cube.

TABLE 1

| Item | Specifications |
| --- | --- |
| Size of segment [mm] | 0.5-1 |
| Surface roughness Ra[μm] | 0.005 or smaller |
| Flatness [μm] | 0.3 or smaller |

"Size of segment" will be described later using FIG. 9. "Surface roughness" means the arithmetic mean of absolute values of height of points on a machined surface in a unit area with respect to a plane having the mean value of height of the points. "Flatness" means a distance between tow completely flat planes when each surface of the corner cube is sandwiched between the two planes.

The shape of a mold for the corner cube corresponds to the shape of the corner cube shown in FIG. 8. Material of the mold is, for example, nickel-phosphorus coating, oxygen-free copper or aluminum alloy.

Figure 9:
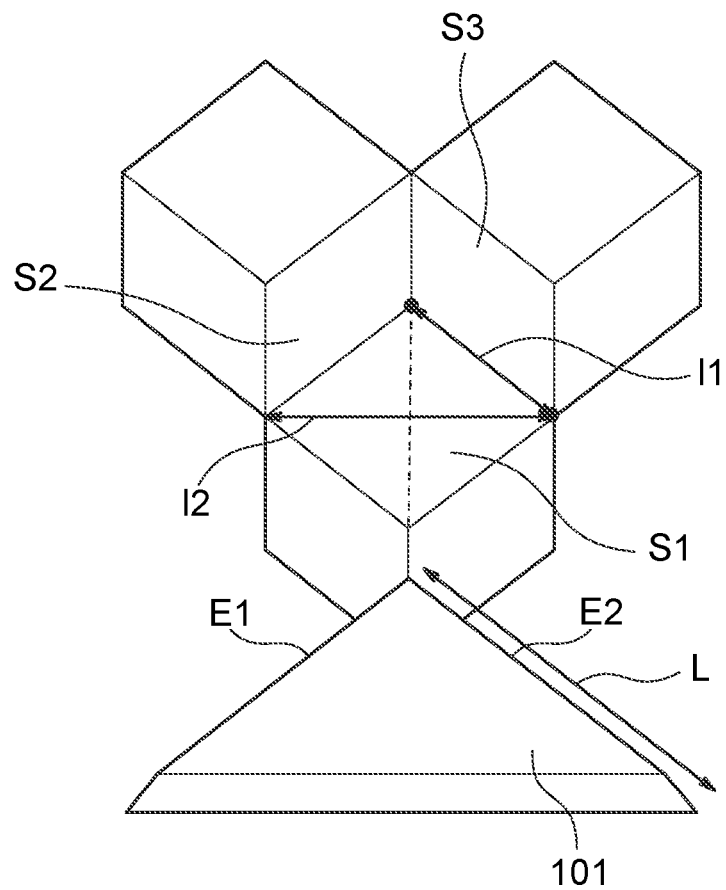
FIG. 9 shows three faces S1, S2 and S3 of a mold for the corner cube and a blade portion.

FIG. 9 shows three faces S1, S2 and S3 of a mold for the corner cube and a blade portion 101. By way of example, the length l1 of an edge of a square face is 354 micrometers, and the length l2 of the diagonal line of the square face, that is, the size of segment is 500 micrometers. The angle formed by the two straight edges E1 and E2 of the blade portion 101 is 90 degrees. Further, the length L of each of the straight edge E1 and the straight edge E2 is required to be longer than the length l1 of an edge of the square face.

Figure 10:
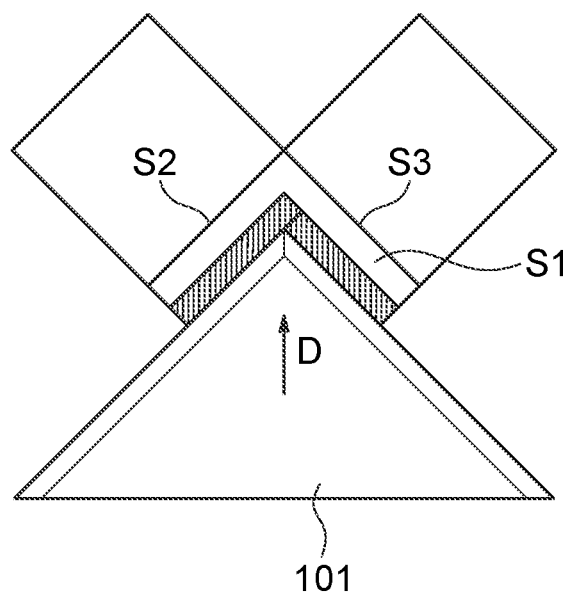
FIG. 10 shows a top view of the mold for the corner cube.

FIG. 10 shows a top view of the mold for the corner cube. The plane of FIG. 10 is parallel to the face S1. When the tip of the blade portion 101 travels in the direction D towards the edge that is the line of intersection between the face S2 and the face S3 (in FIG. 10, the line of intersection being represented as the point of intersection between the lines representing S2 and S3), the face S1 is cut.

Figure 11:
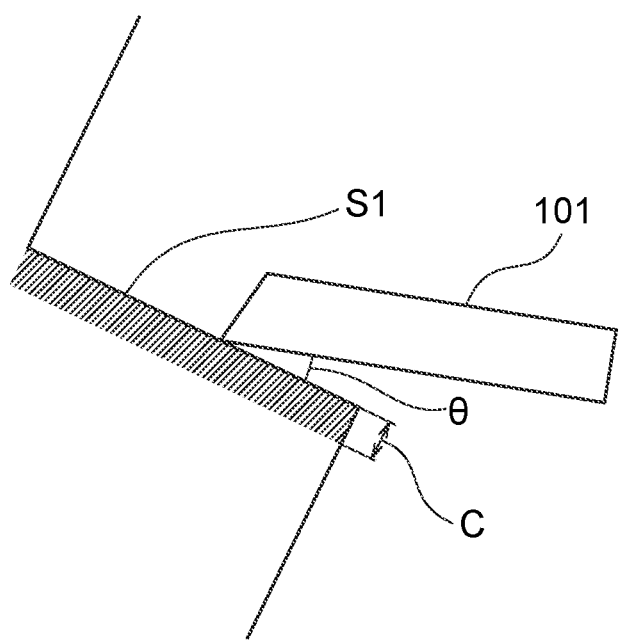
FIG. 11 shows a side view of the mold for the corner cube.

FIG. 11 shows a side view of the mold for the corner cube. The plane of FIG. 11 is perpendicular to the face S1. The angle of relief of the blade portion 101 should preferable be 1 degree or smaller. In FIG. 11, an amount of depth of cut on a surface corresponding to the face S1 is represented as C.

Figure 12:
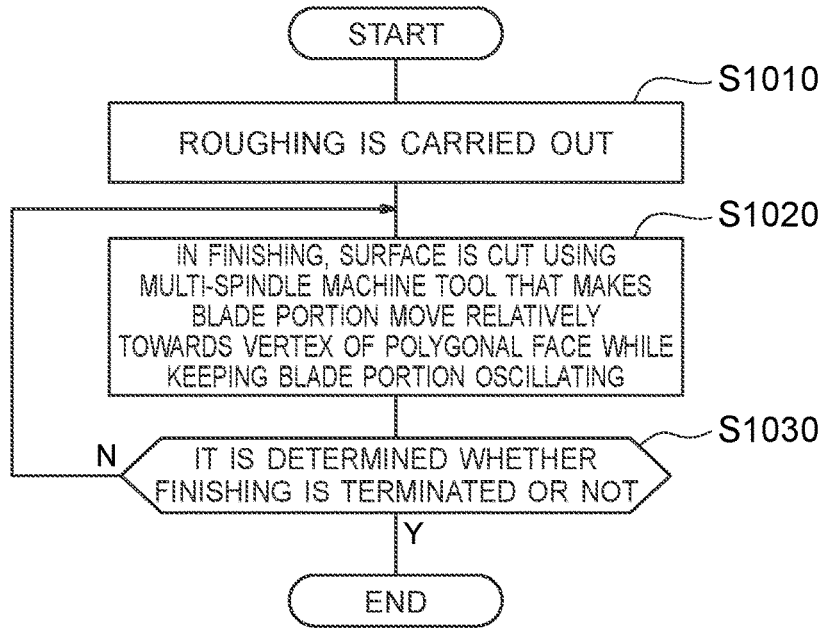
FIG. 12 is a flowchart for explaining a method for manufacturing a retroreflective optical element according to an embodiment of the present invention.

FIG. 12 is a flowchart for explaining a method for manufacturing a retroreflective optical element according to an embodiment of the present invention.

In step S1010 of FIG. 12, the roughing is carried out. In the roughing, cutting is carried out in such a way that an cutting amount in a finishing process is left with respect to a desired shape.

The roughing can be carried out by a multi-axis machine tool provided with a cutting tool that is used for the finishing such as those explained using FIGS. 3 and 4. In this case, provided that a workpiece is not removed during operations of transfer from the roughing to the finishing, a cutting amount in the finishing can be reduced, by way of example, to 1 micrometer to 1.5 micrometers, because it is unnecessary to take into account of a displacement due to a cutting tool change.

The roughing can be carried out by a multi-axis machine tool provided with a ball end mill, for example. In this case, uncut areas are left around the vertex of a polygonal face and corners corresponding to two of the three edges that meet at the vertex because of the curvature of radius of the portion corresponding to the ball of the ball end mill. Further, it is necessary to take into account of a displacement due to a cutting tool change during operations of transfer from the roughing to the finishing. Taking into account of the uncut areas and the displacement described above, a cutting amount in the finishing is, by way of example, 50 micrometers.

In step S1020 of FIG. 12, the finishing is carried out by the multi-axis machine tool provided with a cutting tool such as those explained using FIGS. 3 and 4. In the finishing, cutting of the cutting amount described above is carried out. More specifically, in the finishing, a surface is cut using the multi-axis machine tool that makes a blade portion move relatively towards the vertex of the polygonal face while keeping the blade portion oscillating.

Figure 13:
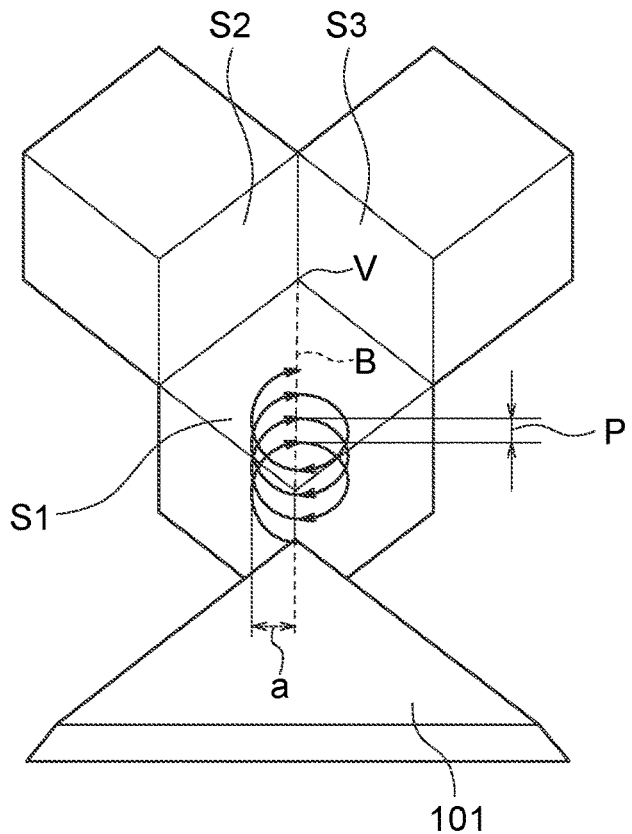
FIG. 13 illustrates the finishing in which the movement of the blade portion is a combination of a linear motion towards the vertex of the polygonal face and a circular motion.

FIG. 13 illustrates the finishing in which the movement of the blade portion is a combination of a linear motion towards the vertex of the polygonal face and a circular motion. In this case, oscillation of the blade portion is effected by the circular motion. The movement of the blade portion is a combination of a constant-speed linear motion of a point along a straight line towards the vertex V of the square face S1 and a circular motion in a clockwise or a counterclockwise direction, the center of the circular motion being on the point and the radius of the circular motion having a predetermined value. The straight line passing through the vertex V is the bisector B of the interior angle of the square face S1. The predetermined value of the radius can be determined such that the value gradually decreases as the point approaches the vertex of the polygonal face.

An arbitrary point on the bisector B is selected as the reference point, and the position vector of the tip of the blade portion is represented as below.

$$\vec{r}$$

The unit vector in the direction of the linear motion described above is represented as below.

$$\vec{u}$$

Then the position of the tip of the blade portion is represented as below when the elapsed time is represented as t, the velocity of the linear motion described above as c, the predetermined value of the radius is represented as a, and the angular velocity of the circular motion is ω.

$$\vec{r} = c \cdot t \cdot \vec{u} + a \cdot (\cos \omega t, \sin \omega t)$$

Cutting in the finishing is carried out mainly by the linear motion of the blade portion. When cutting in the finishing is carried out by the linear motion of the blade portion alone, however, height of the surface can remarkably change at random so that flatness of the machined surface may go out of a tolerance. For this reason, cutting is carried out while the linear motion is periodically and temporarily interrupted by adding oscillation through the above-described circular motion to the linear motion of the blade portion.

The oscillation through the above-described circular motion is discontinued shortly before the tip of the blade portion reaches the vertex of the polygonal face, and thereafter cutting is carried out by the linear motion of the blade portion alone.

The above-described oscillation is generated in a plane substantially identical with the plane formed by the two edges of the blade portion 101 shown in FIG. 9. More specifically, an inclination of the plane of oscillation relative to the plane formed by the two edges of the blade is within 3 degrees. The state of the plane of oscillation of other embodiments is as in the case described above.

In step S1030 of FIG. 12, it is determined whether the finishing is terminated or not. By way of example, the number of times that cutting is carried out in order to obtain a desired roughness (the number of passes) can be previously determined such that the finishing can be terminated after cutting has been carried out the determined number of times. If it is determined to terminate the finishing, the process is terminated. If it is determined continue the finishing, the process returns to step S1020.

Table 2 shows an example of the machining conditions of the finishing described using FIG. 13.

TABLE 2

| Items | Set values |
| --- | --- |
| Size of segment [mm] | 0.5 |
| Feed speed of the machine [mm/min] | 1~10 |
| Depth of cut [μm] | 0.5 |
| Amplitude of circular motion a [μm] | 2~5 |
| Pitch of traveling circular motion P[μm] | 1~10 |
| Time required for one pass [sec] (in the case of pitch of traveling circular motion of 10 μm) | 771 |
| Number of passes in the finishing | 2~3 |

In Table 2, the feed speed of the machine means a speed of travel between points on a path of the multi-axis machine tool. Depth of cut means the amount of depth of cut C shown in FIG. 11 for each one-time cutting operation. The amplitude of circular motion a means the predetermined value of radius described above. The pitch of traveling circular motion P is a distance between two adjacent points among the points of intersection between the bisector B described above and the path of the tip of the blade portion. In other words, the above-described distance is a distance that the tip of the blade portion travels in the direction of the linear motion during the period of the circular motion of the tip of the blade portion. The pass means one-time cutting operation. The time required for one pass means a time required for one-time cutting operation of the three surfaces.

In order to prevent a random and abrupt change in height of the machined surface, the amount of depth of cut for one-time cutting operation should preferably be 2 micrometers or smaller, the amplitude of circular motion should preferably range from 0.1 micrometers to 25 micrometers and the distance that the tip of the blade portion travels in the direction of the linear motion during the period of oscillation, that is, the pitch of circular motion should preferably range from 0.01 micrometers to 20 micrometers.

Figure 14:
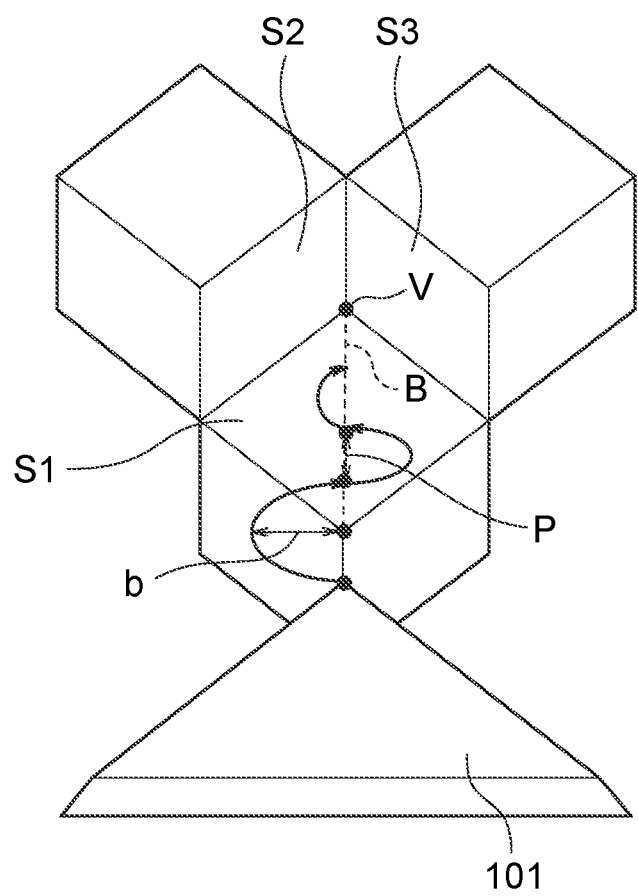
FIG. 14 illustrates the finishing in which the movement of the tip of the blade portion is a combination of a linear motion relatively towards the vertex of the polygonal face and a simple harmonic motion in the direction perpendicular to the direction of the linear motion.

FIG. 14 illustrates the finishing in which the movement of the tip of the blade portion is a combination of a linear motion relatively towards the vertex of the polygonal face and a simple harmonic motion in the direction perpendicular to the direction of the linear motion. In this case, oscillation of the blade portion is effected by the simple harmonic motion. More specifically, the movement of the blade portion is a combination of a constant-speed linear motion of a point along a straight line towards the vertex V of the square face S1 and a simple harmonic motion in the direction perpendicular to the direction of the straight line, the center of the simple harmonic motion being on the point. The straight line passing through the vertex V is the bisector B of the interior angle of the square face S1. The amplitude of the simple harmonic motion can be so determined such that the value gradually decreases as the point approaches the vertex of the polygonal face.

An arbitrary point on the bisector B is selected as the reference point, and the position vector of the tip of the blade portion is represented as below.

$$\vec{r}$$

Further, the unit vector in the direction of the linear motion described above and the unit vector in the direction perpendicular to the direction of the linear motion are represented respectively as below.

$$\vec{u}_1$$

$$\vec{u}_2$$

Then the position of the tip of the blade portion is represented as below when the elapsed time is represented as t, the velocity of the linear motion described above is c, the amplitude of the simple harmonic motion is represented as b, and the angular velocity of the circular motion corresponding to the simple harmonic motion is ω.

$$\vec{r} = c \cdot t \cdot \vec{u}_1 + b \cdot \sin(\omega \cdot t) \cdot \vec{u}_2$$

The direction of the unit vector $$\vec{u}_2$$

can be determined such that the direction is not perpendicular to the direction of the linear motion but forms an acute angle with the direction of the linear motion.

By adding oscillation through the above-described simple harmonic motion to the linear motion of the blade portion, cutting is carried out while the linear motion is periodically and temporarily interrupted.

The oscillation through the above-described simple harmonic motion is discontinued shortly before the tip of the blade portion reaches the vertex of the polygonal face, and thereafter cutting is carried out by the linear motion of the blade portion alone.

Table 3 shows an example of the machining conditions of the finishing described using FIG. 14.

TABLE 3

| Items | Set values |
| --- | --- |
| Size of segment [mm] | 0.5 |
| Feed speed of the machine [mm/min] | 1~10 |
| Depth of cut [μm] | 0.5 |
| Amplitude of simple harmonic motion b [μm] | 2~5 |
| Half value P of wavelength of sine curve [μm] | 1~10 |

Half value P of wavelength of sine curve is a distance between two adjacent points among the points of intersection between the bisector B described above and the path of the tip of the blade portion. In other words, the above-described distance is a distance that the tip of the blade portion travels in the direction of the linear motion during the half period of the simple harmonic motion of the tip of the blade portion.

Figure 15:
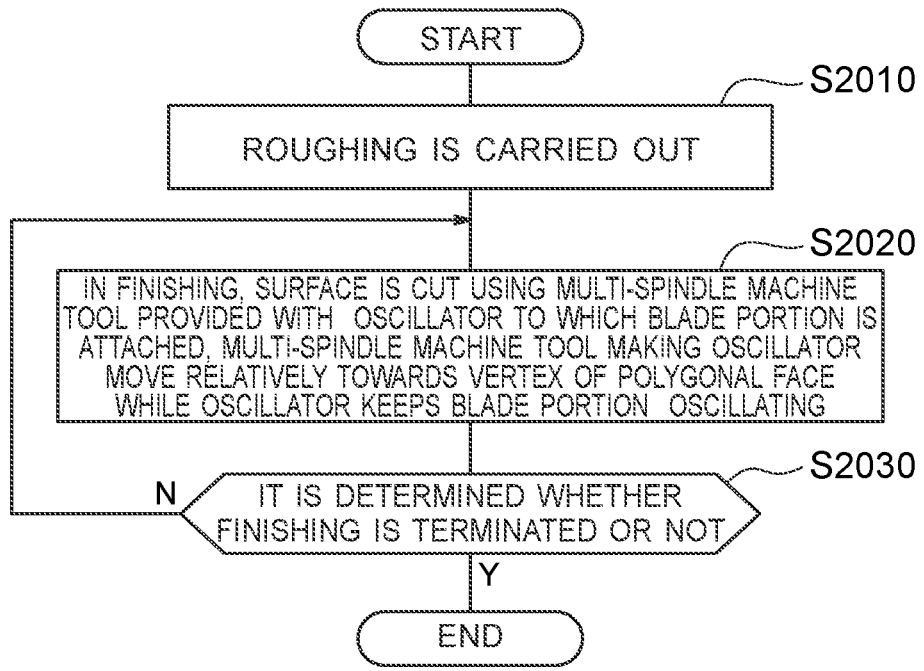
FIG. 15 is a flowchart for explaining a method for manufacturing a retroreflective optical element according to another embodiment of the present invention.

FIG. 15 is a flowchart for explaining a method for manufacturing a retroreflective optical element according to another embodiment of the present invention.

In step S2010 of FIG. 15, the roughing is carried out. In the roughing, cutting is carried out in such a way that a cutting amount in the finishing is left with respect to the intended shape.

The roughing can be carried out by a multi-axis machine tool provided with a ball end mill. In this case, uncut areas are left around the vertex of a polygonal face because of the curvature of radius of the portion corresponding to the ball of the ball end mill. Further, it is necessary to take into account of a displacement due to a cutting tool change during operations of transfer from the roughing to the finishing. Taking into account of the uncut areas and the displacement described above, a cutting amount in the finishing is, by way of example, 50 micrometers.

In step S2020 of FIG. 15, the finishing is carried out by the multi-axis machine tool provided with a cutting tool such as those explained using FIGS. 5 to 7. More specifically, in the finishing, a surface is cut using the multi-axis machine tool provided with an oscillator to which a blade portion is attached. The multi-axis machine tool makes the oscillator move relatively towards the vertex of the polygonal face while the oscillator keeps the blade portion oscillating.

Figure 16:
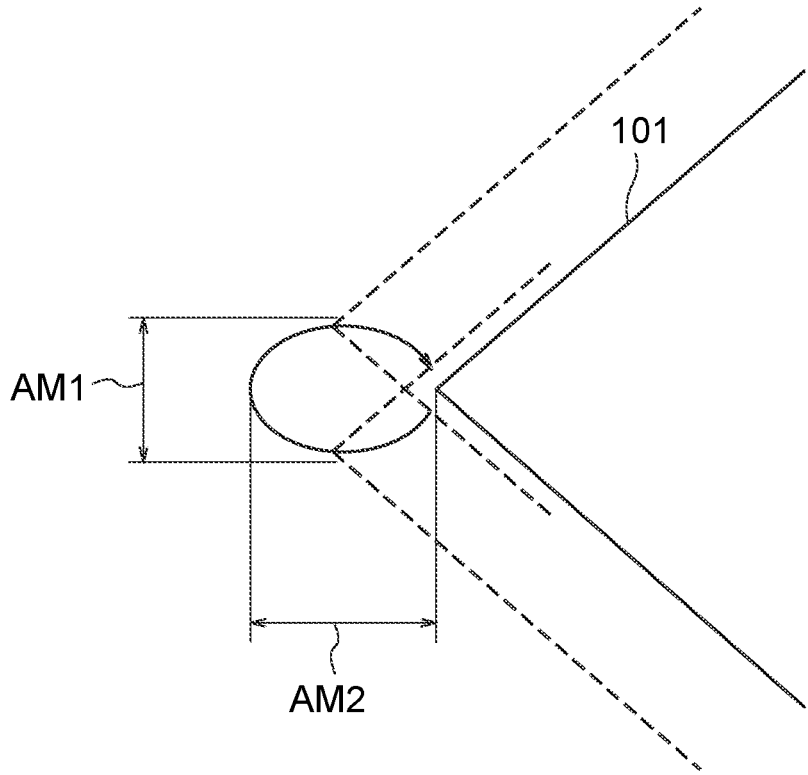
FIG. 16 illustrates an elliptic motion of a blade portion 101 by the oscillator. In this case, oscillation of the blade portion is effected by the elliptic motion described above.

FIG. 16 illustrates an elliptic motion of the blade portion 101 by the oscillator. In this case, oscillation of the blade portion is effected by the elliptic motion described above. The value of the double amplitude of the elliptic motion in the direction perpendicular to the above-described direction is represented by AM1, and the value of the double amplitude of the elliptic motion in the direction of the bisector of the opening angle of the blade portion is represented by AM2.

The oscillator oscillates and bends when a voltage the frequency of which corresponds to the resonance frequency of a piezoelectric element is applied to the piezoelectric element provided at the base of the oscillator. This motion of the oscillator generates an elliptic motion of the blade portion attached to the end thereof.

The motion of the blade portion 101 caused by the multi-axis machine tool is a constant-speed linear motion relatively towards the vertex V of the square face S1 shown in FIG. 13 along the bisector B passing through the vertex V. The motion of the blade portion 101 is a combination of the elliptic motion caused by the oscillator and the linear motion caused by the multi-axis machine tool.

In step S2030 of FIG. 15, it is determined whether the finishing is terminated or not. By way of example, the number of times that cutting is carried out (the number of passes) in order to obtain a desired roughness can be previously determined such that the finishing can be terminated after cutting has been carried out the determined number of times. If it is determined to terminate the finishing, the process is terminated. If it is determined to continue the finishing, the process returns to step S2020.

Table 4 shows an example of the machining conditions of the finishing step using an oscillator described as step S2020 of FIG. 15.

TABLE 4

| Items | Set values |
|---|---|
| Size of segment [mm] | 0.5 |
| Feed speed of the machine [mm/min] | 50 |
| Depth of cut [μm] | 0.5 |

TABLE 4-continued

| Items | Set values |
|---|---|
| Double amplitude of elliptic motion AM1 [μm] | 1 |
| Double amplitude of elliptic motion AM2 [μm] | 4 |
| Frequency of elliptic motion [kHz] | 41.5 |
| Travelled distance in linear motion direction of blade portion during period of oscillation [μm] | 0.02 |
| Time required for one pass [sec] | 16 |
| Number of passes in the finishing | 2~3 |

In order to prevent a random and abrupt change in height of the machined surface, the amount of depth of cut for one-time cutting operation should preferably be 2 micrometers or smaller, the amplitudes of elliptic motion should preferably range from 0.1 micrometers to 25 micrometers and the distance that the blade portion travels in the direction of the linear motion during the period of oscillation should preferably range from 0.01 micrometers to 20 micrometers.

When the blade portion is made to oscillate by the machine tool as shown in the follow chart of FIG. 12, oscillation can be given to the blade portion by any one of motions including the circular motion and the simple harmonic motion described above. The amplitude of oscillation such as the radius of a circular motion and the amplitude of a simple harmonic motion can be set to a desired value. Further, the distance that the blade portion travels in the direction of the linear motion during the period of oscillation can be set to a desired value. Machining can be carried out under various conditions in order to determine conditions that minimize the arithmetic mean height of the machined surface. Accordingly, the machining accuracy represented by the arithmetic mean height of the surface is higher than in the case that the blade portion is made to oscillate by an oscillator.

In the case that cutting was carried out in the way as described in FIG. 13 under the machining conditions shown in Table 2, the arithmetic mean height of the surface was 0.002 micrometers and the flatness of the surface was 0.017 micrometers. The arithmetic mean height of a surface means the arithmetic mean of absolute values of height of points on the machined surface in a cross section to be measured with respect to the mean value of height of the points and corresponds to the surface roughness. The flatness of a surface is determined by a waviness that means irregularities of a machined surface, spacing of which is relatively great.

Thus, a corner cube with the specifications shown in Table 1 was successfully made by an injection molding process using a mold manufactured through finishing in which the blade portion is made to oscillate by the machine tool as described using FIG. 13.

In the case that the blade portion is made to oscillate by an oscillator as shown in the flowchart of FIG. 15, conditions of the oscillator is fixed, and therefore conditions of oscillation of the blade portion cannot be determined so flexibly as in the case that the blade portion is made to oscillate by the machine tool. The distance that the blade portion travels in the direction of the linear motion during the period of oscillation can be changed by a speed of the blade portion in the direction of the linear motion alone. In the case that the blade portion is made to oscillate by an oscillator, however, the machine tool travels in the direction of the linear motion alone, and therefore a machining time is remarkably smaller than in the case that the blade portion is made to oscillate by the machine tool.

In the case that cutting was carried out in the way as described in FIG. 15 under the machining conditions shown in Table 4, the arithmetic mean height of the surface was 0.004 micrometers and the flatness of the surface was 0.048 micrometers.

Thus, a corner cube with the specifications shown in Table 1 was successfully made by an injection molding process using a mold manufactured through the finishing process in which the blade portion was made to oscillate by the machine tool as described using FIG. 15.

On the other hand, when cutting is carried out by a linear motion alone of the blade portion, the linear motion being not accompanied by oscillation, height of the surface can remarkably change at random so that the flatness of the surface can hardly be kept within a tolerance.

Further, when a mold for a corner cube having a size of segment of 0.5 millimeter was cut through micro-chiseling, the arithmetic mean height of the cut surface was 0.166 micrometers and the flatness of the surface was 0.7 micrometers so that a corner cube with the specifications shown in Table 1 could not be obtained.

Further, a reflector in which the angles between the three faces are slightly changed from those of a cubic has been developed (for example, JP3340640). In such a reflector, a difference between the vertex angle of "a square face" and 90 degrees is not at most 0.1 degrees. Accordingly, when the size of segment of a reflector is around 0.5 millimeters, a reflector with a specified precision can be manufactured without any problems by a manufacturing method according to the present invention, using a blade portion the angle between the two edges of which is 90 degrees.

In the above, corner cubes were described as examples of retroreflective elements. The present invention can be applied to retroreflective elements having other types of polygonal faces than the square face.

As described above, a high-precision corner cube with the specifications shown in Table 1 can be made by an injection molding process using a mold manufactured by a method for manufacturing a mold for a retroreflective element according to the present invention.

What is claimed is:

1. A method for manufacturing a mold for a retroreflective element having plural polygonal faces, the mold having plural polygonal faces having a common vertex, the method including the steps of:

roughing of a polygonal face in which cutting is carried out such that a predetermined cutting amount in a finishing process is left with respect to a shape to be obtained, the polygonal face corresponding to one of the plural polygonal faces of the retroreflective element; and finishing of the polygonal face in which a blade portion having two cutting edges, an angle formed by the two cutting edges being substantially identical with an interior angle of the polygonal face at the vertex and a length of each of the two cutting edges being equal to or greater than a length of each of the edges of the polygonal face meeting at the vertex, is made to move relatively towards the vertex while an angle between the polygonal face and a surface of the blade portion edged by the two cutting edges is kept within 1 degree and the blade portion is kept oscillating such that cutting of the predetermined cutting amount of the polygonal face is carried out using the two cutting edges and flatness of the polygonal face is kept tolerable, wherein a depth of cut for each one-time cutting operation is 2 micrometers or smaller, and a movement of the blade portion is a combination of a linear motion towards the vertex and an oscillation, and wherein a distance travelled by the blade portion in a direction of the linear motion during a period of the oscillation ranges from 0.01 micrometers to 20 micrometers.

2. The method for manufacturing a mold for a retroreflective element according to claim 1, wherein the absolute value of inclination of a plane of the oscillation from a plane formed by the two cutting edges is within 3 degrees.

3. The method for manufacturing a mold for a retroreflective element according to claim 1, wherein a displacement caused by the oscillation in a direction of the linear motion ranges from 0.1 micrometers to 25 micrometers.

4. The method for manufacturing a mold for a retroreflective element according to claim 1, wherein the blade portion is attached to a multi-axis machine tool, and the linear motion and the oscillation are carried out by the multi-axis machine tool.

5. The method for manufacturing a mold for a retroreflective element according to claim 1, wherein the blade portion is attached to an oscillator, and the oscillator is attached to a multi-axis machine tool such that the linear motion is carried out by the multi-axis machine tool, and the oscillation is carried out by the oscillator.

6. The method for manufacturing a mold for a retroreflective element according to claim 1, wherein the retroreflective element is a corner cube, and the angle formed by the two edges of the blade portion is 90 degrees.

7. A method for manufacturing a retroreflective element using a mold manufactured by the method for manufacturing a mold for a retroreflective element according to claim 1.

8. The method for manufacturing a mold for a retroreflective element according to claim 6, wherein the oscillation is brought by a circular motion, an elliptic motion or a simple harmonic motion.

* * * * *